Feb. 17, 1931.  W. CAMERON  1,792,812
THREADING MACHINE
Filed Jan. 9, 1929  6 Sheets-Sheet 2

Feb. 17, 1931.                    W. CAMERON                    1,792,812
                                THREADING MACHINE
                              Filed Jan. 9, 1929            6 Sheets-Sheet 3

Feb. 17, 1931.  W. CAMERON  1,792,812
THREADING MACHINE
Filed Jan. 9, 1929  6 Sheets-Sheet 6

Inventor
William Cameron
By Ira J. Wilson
Atty

Witness
R B Davison

Patented Feb. 17, 1931

1,792,812

UNITED STATES PATENT OFFICE

WILLIAM CAMERON, OF CHICAGO, ILLINOIS, ASSIGNOR TO CAMERON CAN MACHINERY CO., OF CHICAGO, ILLINOIS, A CORPORATION OF ILLINOIS

THREADING MACHINE

Application filed January 9, 1929. Serial No. 331,324.

This invention relates in general to machines for operating upon metal articles and more particularly to a machine for forming threads or other configurations at or near the end of a cylindrical or tubular metal body.

One of the primary purposes of this invention is to provide a machine which will produce threads or other configurations upon metal bodies with accuracy and at a high rate of speed so that these articles may be turned out automatically and economically with a minimum of attention by the operator of the machine.

Another object is to produce a machine for the purpose indicated which will be strong and durable and capable of operating upon bodies formed of very heavy metal, and perform the desired operation upon each body by the conjoint action of a stationary and a movable die, the stationary die being adapted to cooperate with a plurality of movable dies so that a plurality of bodies may be worked upon simultaneously, thereby resulting in a maximum output for the machine.

Other objects of this invention will be apparent as the same becomes better understood from an examination of the specification and claims in connection with the accompanying drawings wherein:

Referring to the drawings more particularly, reference character 1 designates the base which together with spaced uprights 2 and 3 and connections therebetween form the frame of the machine.

The upper ends of the uprights 2 and 3 are provided respectively with aligned bearings 4 and 5. These bearings cooperate to support a rotatable work and spindle carrier generally designated by the reference numeral 19 containing a plurality of annularly arranged spindles 6 and a work receiving drum 27. A feed chute 10 is supported in an inclined position for delivering articles to be threaded to the drum 27 where the articles are received in longitudinal grooves 29 in said drum in alignment with the respective spindles 6. These spindles 6 are provided at their inner ends with inner thread rolling dies 41 respectively and are adapted to receive the articles over said dies. The articles are successively delivered over the respective dies 41 by plungers 46 carried by the work and spindle carrier 19, one in alignment with each spindle and adapted to cooperate with the inner dies for supporting the articles thus delivered. The plungers 46 are controlled by suitable cam mechanism which will be hereinafter described. As the work and spindle carrier rotates, the inner dies 41 successively cooperate with a stationary thread rolling die 7 whereby a plurality of articles are in simultaneous engagement with said die in successive stages of completion so far as the thread rolling operation is concerned to thereby greatly expedite the rate of operation of the machine.

Extending longitudinally of the bed and journalled between the lower portions of the respective uprights 2 and 3 is a main drive shaft 8 which is suitably geared at its projecting end to an electric motor 9 mounted upon the bed 1. The shaft 8 is provided with a pinion gear 11 at its other projecting end adapted to drive a second shaft 12 through the intermediary of a gear 13 mounted thereon. The shaft 12 is journaled between the uprights 2 and 3 intermediate the work and spindle carrier 19 and the shaft 8 and is adapted to rotate said carrier as will presently be described.

A shaft 14 is supported at one end by the bearing 5 through the intermediary of a sleeve 15 within said bearing and surrounding said shaft. The other end of the shaft 14 extends into a cylindrical cam block 16 which forms a part of the mechanism for controlling the plungers 46 and is supported by said block, the latter being bolted at one end to a flange 17 which is integral with a cylindrical body 18 supported within the bearing 4.

The shaft 14 is normally stationary except when it is being adjusted for a purpose which will be explained hereinafter and serves to support a spindle carrier generally designated by the reference character 19. The work and spindle carrier 19 includes a spindle supporting member comprising a pair of longitudinally spaced spiders 21 and 22 connected at their hubs by an integral cylindrical portion 23. This spindle supporting member is adapted to rotate on the shaft 14 on a bushing 24 surrounding said shaft and is driven by a gear 25 on the shaft 12 in mesh with a gear 26 integrally formed on the periphery of the spider 22. The spindles 6 are here shown as four in number and are longitudinally journaled between the spiders 21 and 22 in equi-angular arrangement about and equi-distant from the axes of said spiders. Longitudinal thrust on the spindles is taken up by split collars 20 mounted on reduced portions of the spindles between the spiders.

The cylindrical member 18 and cam block 16 also serve to support the work receiving drum 27 which surrounds the shaft 14 and extends longitudinally between the stationary die 7 and said block.

The drum 27 is provided at its outer end with an inwardly extending circular flange 33 which is attached to the inner end of an annular casting 28 surrounding the block 16 and forming a guide for plunger supporting blocks 47. The outer end of the casting 28 is attached to the web of a gear 37. The hub of the gear 37 is provided with a circular flange 38 presenting an angular bearing surface which is adapted to bear against the outer side of the flange 17 and the flange 33 on the drum bears against the inner side of the block 16 outwardly of a reduced portion 34 thereof to take up longitudinal thrust in both directions on the drum 27 and gear 37. The gear 37 is in mesh with a gear 39 on the shaft 12 whereby the same may drive said drum 27 in unison with the spindles.

The inner dies 41 are removably attached to their respective spindles and are each provided with a central supporting member 42 in the form of a cylindrical member flanged at its outer end to engage the die and hold the same against outward movement. The member 42 extends into a central recess on the inner end of the spindle 6 and is tapped and threaded to receive the inner end of a bolt 43 which extends longitudinally of the spindle from the outer end thereof for attaching the die to the inner end of the spindle.

Each spindle 6 is provided at its outer end with an integral pinion 44 in mesh with a stationary gear 45 mounted on the inner end of the sleeve 15 for causing rotation of the spindles as the spindle carrier 19 is rotated.

Each plunger 46 is provided at its inner end with a rotatable bearing plate 40 and a roller bearing unit therefor for engaging the articles to be threaded and facilitating the free rotation of said articles by the spindles.

The web of the gear 37 and an outwardly extending circular flange 35 on the drum 27 are apertured to receive the four plungers 46 one in alignment with each of the spindles 6. The plungers 46 are adapted to successively deliver the articles as they are received in the respective recesses 29 of the drum from the feed chute 10 over their respective dies 41. The holder supporting blocks 47 are split and are adjustably clamped to the respective plungers by bolts 48. Each block 47 is guided in a corresponding guideway 49 formed in the member 28 and is reciprocated by a cam follower 51 disposed in a cam groove 52 formed in the periphery of the block 16 for causing properly timed actuation of the plungers. Retaining plates 31 for the blocks 47, one on either side of each block, engage lateral flanges on said blocks and are attached to the block 28.

Figure 7:
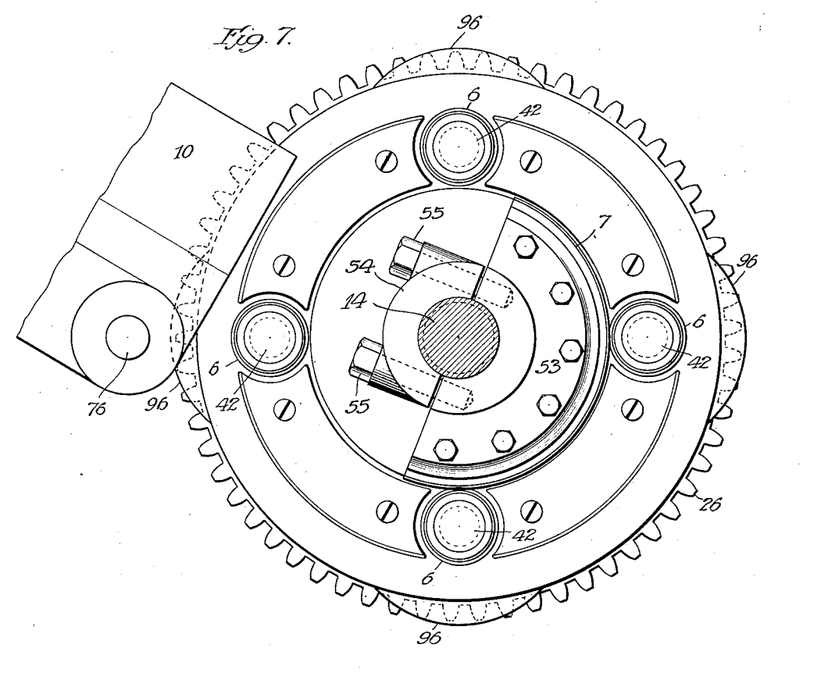
Fig. 7 is an enlarged detail fragmentary view showing a portion of the feed chute and a transverse section of the machine showing the relative position of the stationary die and the spindles.
Figure 8:
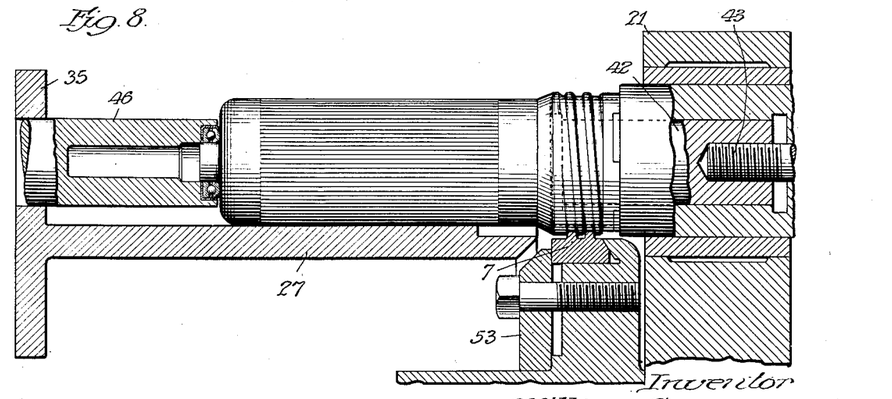
Fig. 8 is an enlarged fragmentary view showing the cooperation between the spindles and stationary die for rolling threads on the grease gun bodies.

As shown in Fig. 7 the outer threading die 7 is semi-circular in form and is adapted to engage each body or cap through 180° of rotation of the drum and spindle carrier. This die 7 is supported on a sector plate 53 which is clamped to the shaft 14 by means of an opposed clamping member 54 and bolts 55.

The configuration of the cam groove 52 is such that the plungers 46 will force the articles over the inner dies on the respective spindles just prior to the time of engagement of the respective articles with the die 7 and said plungers will be withdrawn gradually thereafter so as to permit the articles to be ejected as soon as they have passed out of engagement with said die.

The mechanism for ejecting the articles includes a sleeve 56 loosely mounted on the shaft 12 and provided with a rearwardly extending arm 57 having a short transverse shaft 58 journaled in its free end. A gear 59 is mounted on this shaft 58 for driving the same and is in mesh with a gear 61 on the shaft 12 whereby the latter shaft may drive said shaft 58. A disk 62 having a serrated periphery is also mounted on the shaft 58 and is driven with said shaft. A rod 63 is pivotally connected at its upper end to the shaft 58 and is spring pressed upwardly by means of an expansion spring 64 surrounding said rod and disposed between a nut 65 thereon and an enlargement 66 of a shaft 67 supported between the upper ends of a pair of uprights 68 on the base 1. The disk 62 is thus yieldingly urged into engagement with the articles as they leave the die 7 and being rotated in a direction opposite to that of the spindles it screws said bodies off of the inner threading dies so as to permit their ejection.

The chute 10 is removably suported upon a bracket 73 to which it is secured by bolts 72 having their heads disposed in a T slot formed in the base member 69 of the chute. The bracket 73 comprises the arms 77 connected by a rod 75 and secured to the uprights of the machine frame by a rod or bolt 76.

Mechanism is provided for automatically stopping the machine when the supply of bodies or caps in the chute becomes exhausted. This mechanism includes a transverse shaft 78 journaled in and extending between the walls of the chute above the path of the article therein. This shaft has splined thereon a feeler finger 79 adapted to be periodically actuated through the intermediary of the shaft 78 to press against the bodies or caps in the chute. Also mounted on the shaft 78 is an arm 81 for actuating said shaft. This arm 81 is connected by means of a pivoted link 82 to an arm 83 fixed on a shaft 84 which is journaled in one of the extensions 77 of the frame. This shaft 84 has also mounted thereon an arm 85 which is pivotally connected to a slidable collar 86 on the upper end of a rod 87. The rod 87 is adapted to positively lift the finger 79 and yieldingly depress the same through the intermediary of a nut 88 on said rod against which the collar is yieldingly held by a spring 89. The rod 87 is pivotally connected at its lower end to a wrist pin 91 on the outer end of the shaft 12 whereby said rod is actuated during one rotation of said shaft 12 to cause both a depressing and raising of the finger 79. The movement given to the rod 87 is more than that necessary to impart a normal downward movement of the finger 79, the difference being taken up by the spring 89 when said finger engages the bodies or caps in the chute, but if there are no articles in the chute to resist the downward movement of said finger, the finger will travel downwardly in the chute permitting a pin 92 depending from the free end of the lever 81 to contact with the free end of a pivoted arm 93 of a limit switch 94 in circuit with the motor 9 thereby automatically stopping the machine.

In the operation of the machine, the chute is filled with articles and the motor started to cause the rotation of the work and spindle carrier 19. As the grooves 29 of the drum pass in succession beneath the foot of the chute each will receive the lowermost article in the chute and the respective plunger 46 under the action of the cam groove 52 will force the article over the inner threading die 41 of the spindle before the spindle comes abreast of the stationary outer threading die 7. Before any spindle and article thereon has passed out of engagement with the outer threading die 7 the succeeding spindle and article thereon will have entered into engagement with said die 7 and when it leaves said die 7 said article may be spun off almost immediately by contact with the ejecting mechanism previously described.

Figure 9:
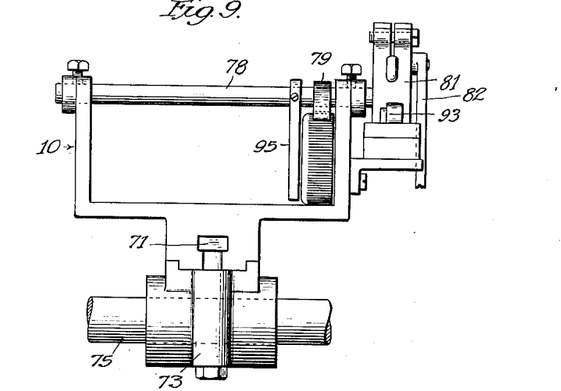
Fig. 9 is a view of the feed chute similar to Fig. 3 illustrating the manner in which the chute may accommodate caps for the grease gun bodies as well as these bodies themselves when it is desired to thread the caps.
Figure 10:
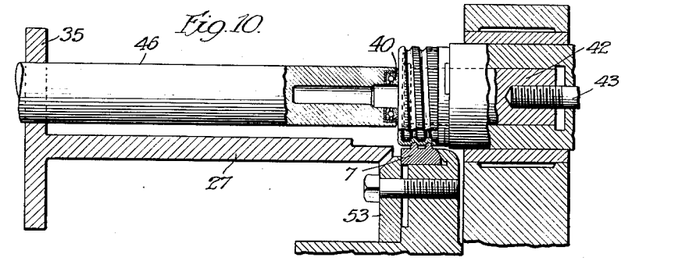
Fig. 10 is a view similar to Fig. 8 showing the relation between the spindles, plungers and stationary die in rolling the caps for the grease gun bodies.
Figure 11:
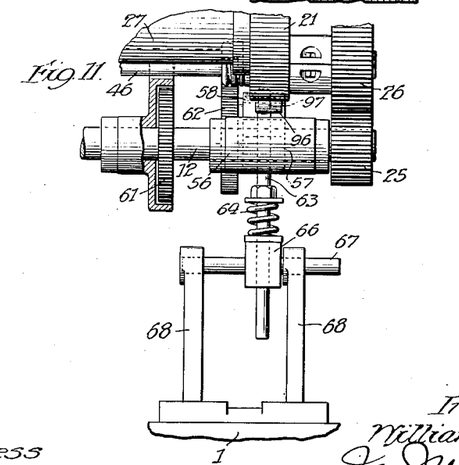
Fig. 11 is a view of the unthreading or discharge mechanism adjusted to eject the caps for the grease gun bodies.

When it is desired to thread caps for the grease gun bodies or similar articles of shorter length, a plate 95 extending longitudinally of the chute and adjustable transversely thereof is moved to the right viewing Fig. 9 to adapt the chute to the shorter articles and the finger 79 is moved to the right on the shaft 78 into the position shown in Fig. 9 where it will be in a position to engage the caps.

It is also necessary when threading caps instead of the bodies of the grease guns to substitute longer plungers for the shorter plungers or otherwise increase the effective length of the plungers by loosening the bolts 48 and changing the position of the plungers in the blocks 47.

Figure 1:
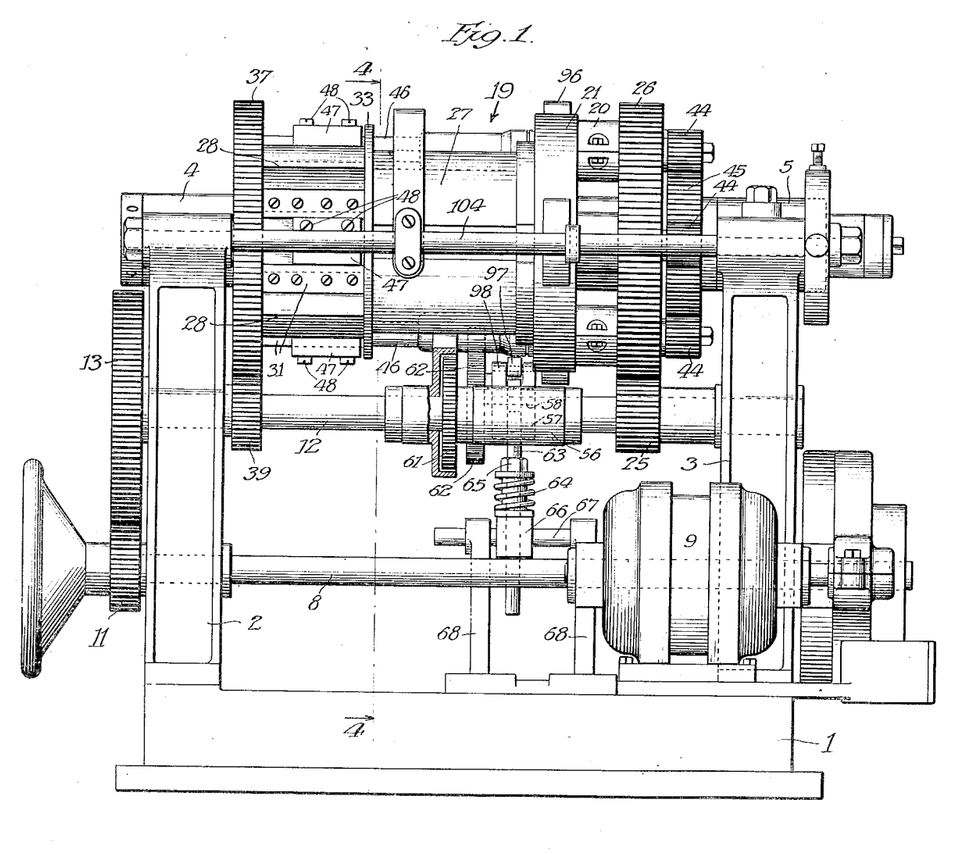
Fig. 1 is a side elevation of a threading machine embodying this invention for threading grease gun bodies and caps therefor.
Figures 2, 3:
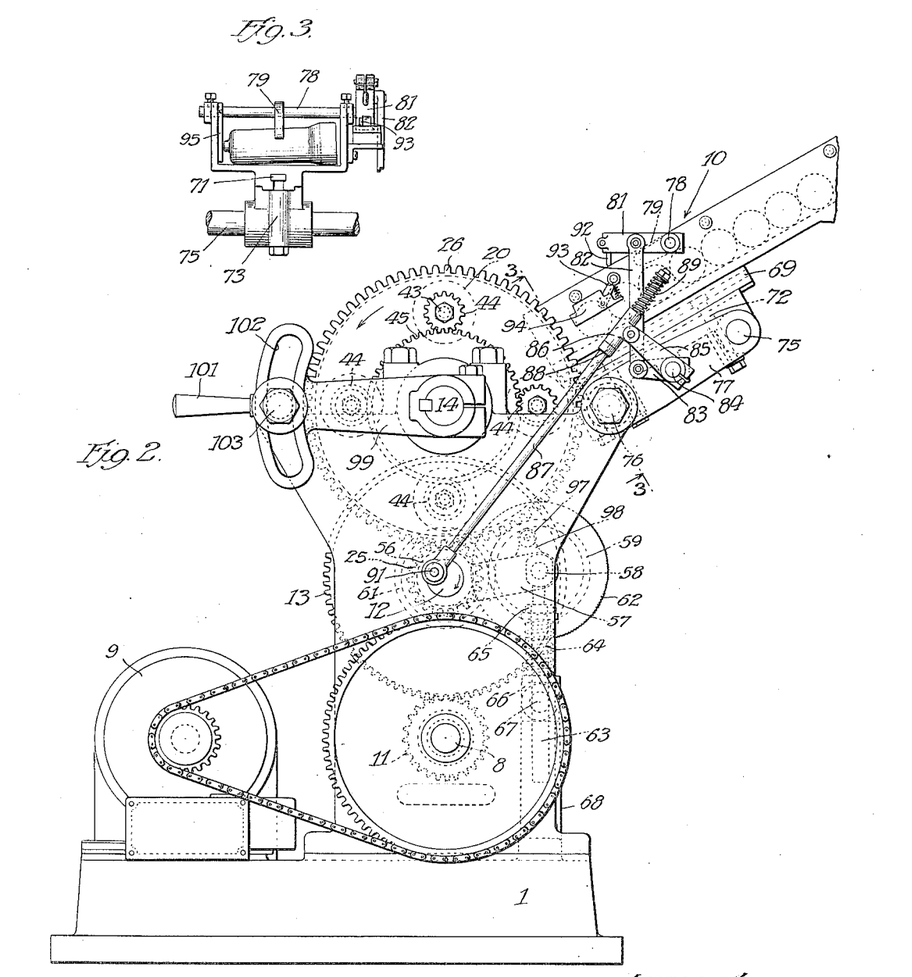
Fig. 2 is an end elevation of the machine as viewed from the right of Fig. 1.
Fig. 3 is a fragmentary section taken at the line 3—3 of Fig. 2.
Figure 4:
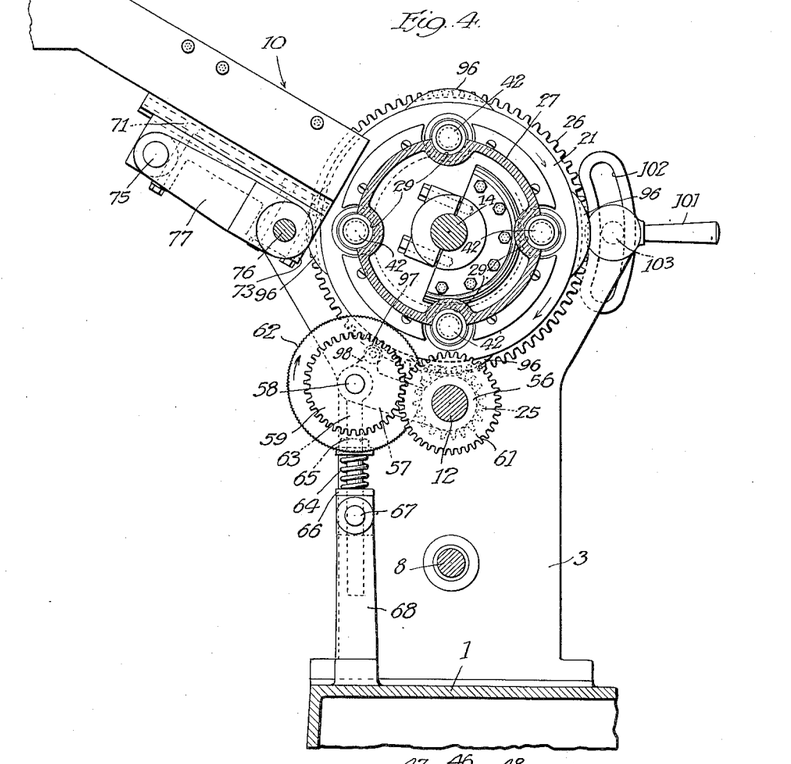
Fig. 4 is a section taken at the line 4—4 of Fig. 1 with parts in elevation.
Figure 5:
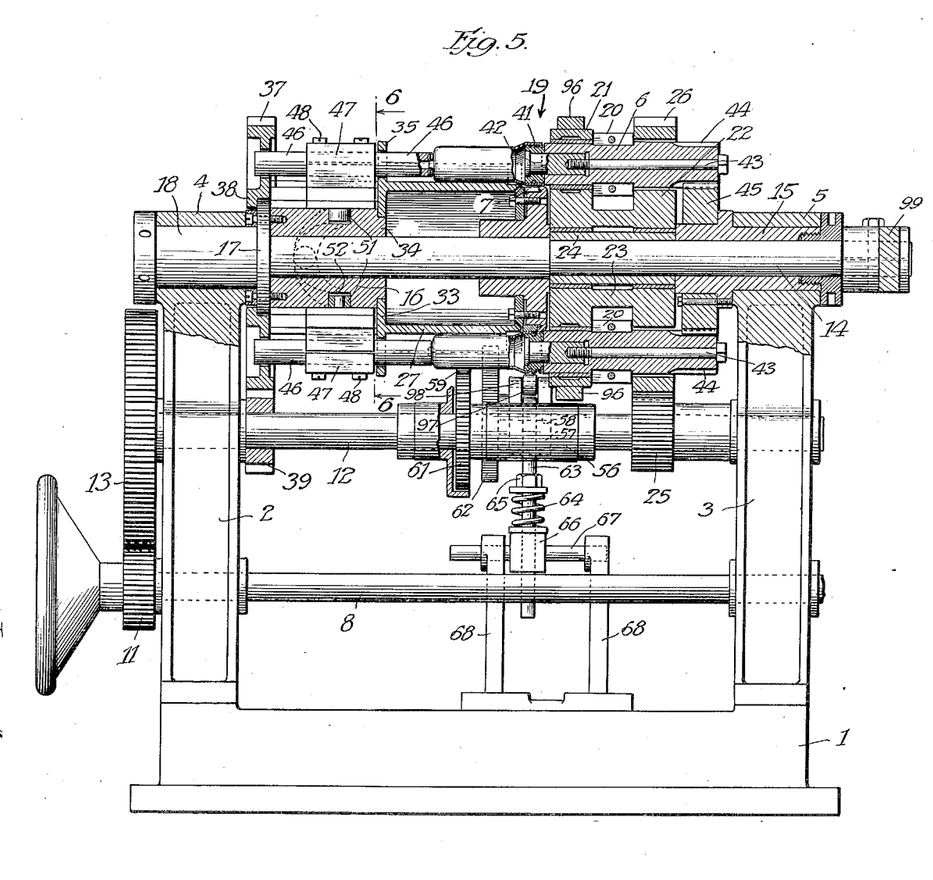
Fig. 5 is a section taken through the longitudinal center line of the machine.
Figure 6:
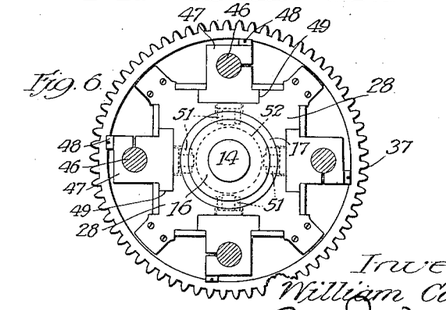
Fig. 6 is a section taken at the line 6—6 of Fig. 5.

In using the machine for threading the caps for the grease gun bodies the ejecting mechanism must also be adjusted to accommodate the lesser length of the caps by shifting the sleeve 56 to the right viewing Fig. 5, which will also cause the shaft 67 to move to the right together with the enlargement 66 thereof.

Since the disk 62 when the machine is being used to thread caps will engage with the threaded portions of the caps instead of the smaller diametrical portions of the grease gun bodies, means is provided for preventing damage to the caps from contact with said disk under increased spring tension. This means includes four arcuate cam members 96 positioned on the outer periphery of the spider 21, one outwardly of each spindle and adapted to engage with a roller 97 carried by a right angular bracket 98 on the arm 57 for limiting the inward movement of the disk 62 at the point where it engages the caps.

In order to permit adjustment of the external threading die so as to provide relative adjustment between the point of engagement therewith by the spindles and the point where the plungers are actuated to dispose the grease gun bodies or caps on the internal threading dies of the spindles, means is provided for varying the rotational position of the normally stationary shaft 14. This means includes an arm 99 keyed at its inner end to the projecting end of the shaft 14 and clamped thereto. The arm 99 is provided with a handle 101 at its outer end and an arcuate slot 102 inwardly of said handle adapted to receive a clamping bolt 103. The bolt 103 is threaded in the outer end of a longitudinal rod 104 which extends between the uprights 2 and 3 and forms a part of the frame. After the desired adjustment of the position of the outer threading die is obtained by manipulating the arm 99 the bolt 103 may be tightened to hold the die in adjusted position.

The relative adjustment between the point where the plungers are actuated to dispose the bodies on the spindles and the point of engagement thereby of external threading die 7 may also be obtained without interfering with the position of said die by adjustably varying the rotatable position of the cylindrical member 18 and cam track thereon.

It will be apparent that the aforedescribed machine effects a maximum of efficiency in providing for continuously operating upon the grease gun bodies and caps to thread the same by having a plurality of bodies or caps in successive stages of completion at all times during the operation of the machine.

While the machine herein described is particularly adapted for threading grease gun bodies and caps therefor it will be obvious that it may be used to thread a multitude of annular bodies without any material change.

The operation and other advantages of the machine will be apparent without further description.

I am aware that many changes may be made without departing from the principles of this invention and I therefore do not wish to be limited to the details shown or described.

I claim:

1. In a machine of the character described, the combination of a plurality of inner dies adapted to receive sheet metal members, means for delivering successive members to said dies, and means cooperating with said dies for rolling the peripheries of said members into predetermined shape.

2. In a machine of the character described, the combination of a plurality of inner dies adapted to receive sheet metal members, means cooperating with said dies for rolling the peripheries of said members into predetermined shape, and means discharging the rolled members successively from said dies.

3. In a machine of the character described, the combination of a plurality of inner dies adapted to receive sheet metal members, means for delivering successive members to said dies, means cooperating with said dies for successively completing the rolling of the periphery of each of said members into predetermined shape, and means for discharging the rolled members successively from the dies.

4. In a machine of the character described, the combination of a plurality of revoluble dies each adapted to receive cylindrical pieces of work, means for rotating said dies bodily about a common central axis, and means cooperating with said dies for rolling threads on the periphery of each of said work pieces in succession.

5. In a machine of the character described, the combination of a plurality of inner dies adapted to receive sheet metal members, means reciprocable relative to the dies for delivering said members thereto, and means cooperating with said dies for rolling the periphery of each of said members into predetermined shape.

6. In a machine of the character described, the combination of a plurality of inner dies adapted to receive sheet metal members, means reciprocable relative to the dies for delivering successive members thereon, and means cooperating with said dies for rolling the peripheries of said members into predetermined shape.

7. In a machine of the character described, the combination of a plurality of annularly arranged inner dies each adapted to receive a sheet metal member, a die member adapted to engage the exterior of said sheet metal members, and means for causing said inner dies to revolve relatively with respect to said die member to cause the same to cooperate with the inner dies for rolling the peripheries of the sheet metal members into predetermined shape.

8. In a machine of the character described, the combination of a plurality of annularly arranged inner dies each adapted to receive a sheet metal member therearound, a die member adapted to engage the exterior of said sheet metal members, means relatively reciprocable with respect to the inner dies for delivering the respective members thereto prior to cooperation of the inner dies with said die member, and means for causing said inner dies to revolve relatively to said die member to cause the same to cooperate with the inner dies for rolling the peripheries of the sheet metal members into predetermined shape.

9. In a machine of the character described, the combination of a plurality of inner dies adapted to receive sheet metal members, means reciprocable relative to the inner dies for delivering said members thereto, cam means for actuating said first means, and means cooperating with said inner dies for rolling the periphery of each of said members into predetermined shape.

10. In a machine of the character described, the combination of a plurality of inner dies adapted to receive sheet metal members, means cooperating with said dies for rolling threads on the periphery of each of said members, and means for automatically unthreading said members from said dies.

11. In a machine of the character described, the combination of a plurality of inner dies adapted to receive sheet metal members, means cooperating with said inner dies for rolling threads on the periphery of each of said members, and means for unthreading successive members from their respective dies.

12. In a machine of the character described, the combination of a plurality of annularly arranged inner dies each adapted to receive a sheet metal member, means cooperating with said dies for rolling the peripheries of said members into predetermined shape, a member adapted to engage a sheet metal member to unthread the same from its respective die, and means for causing the dies to revolve relatively with respect to the unthreading member to cause the same to engage the sheet metal members on the successive dies.

13. In a machine of the character described, the combination of a plurality of annularly arranged inner dies each adapted to receive a sheet metal member, means cooperating with said dies for rolling the peripheries of said members into predetermined shape, a rotatable member adapted to engage the sheet metal members to unthread the same from their respective dies and means for causing the dies to revolve relatively with respect to the unthreading member to cause the same to engage the sheet metal members on the successive dies.

14. In a machine of the character described, the combination of an inner die adapted to receive a sheet metal member, means cooperating with said die for rolling a thread on the periphery of said member, and a rotatable member adapted to engage the sheet metal member for unthreading the same from said die.

15. In a machine of the character described, the combination of a plurality of annularly arranged inner dies each adapted to receive a sheet metal member, a spider for supporting the dies, means adapted to cooperate with said dies for rolling the peripheries of said members into predetermined shape, and means for driving said spider and dies simultaneously.

16. In a machine of the character described, the combination of a plurality of inner dies adapted to receive sheet metal members and arranged in predetermined order, members reciprocable relative to the respective dies for delivering said sheet metal members thereto, means for causing such relative reciprocable movement, and means cooperating with said dies for rolling the peripheries of the sheet metal members into predetermined shape.

17. In a machine of the character described, the combination of a plurality of annularly arranged inner dies each adapted to receive a sheet metal member, a plurality of annularly arranged members reciprocable relative to the respective dies for delivering said sheet metal members thereto, means for causing said dies and relatively reciprocable members to revolve in unison about a central axis, and means adapted to cooperate with said dies as the same revolve for rolling the peripheries of said sheet metal members into predetermined shape.

18. A machine for forming threads or the like on tubular articles, comprising a plurality of movable dies each adapted to operate upon the interior of an individual article, a stationary die adapted to operate upon the exteriors of said articles, and means for causing said movable dies to cooperate in succession with said stationary die in the formation of threads upon successive articles.

19. A machine for operating upon tubular articles, comprising a plurality of dies each adapted to operate upon the interior of an individual article, means for placing each article to be operated upon in cooperative relation with one of said dies, stationary means adapted to cooperate with said dies in succession in performing an operation upon said articles, and means for producing a relative movement between said means and said dies whereby said dies are caused to cooperate in succession with said means.

20. A machine for operating upon tubular articles, comprising a stationary die adapted to operate upon the exteriors of successive articles, a plurality of dies each adapted to operate upon the interior of individual article, means for delivering an article to each of said interior dies, means for revolving each of said interior dies together with its associated article about the axis of the die and simultaneously rotating all of said dies and articles about a common central axis to bring the dies and articles successively into cooperative relation with said exterior die, and means for causing relative rotation between each article and its die to free said article from its die.

21. A machine for operating upon tubular articles comprising a plurality of dies each adapted to revolve upon its own axis, said dies being mounted to rotate bodily about a common axis, means for feeding a work piece to each of said dies, stationary means cooperating with said dies in succession during their rotative movement to operate upon the work pieces, and means for removing said work pieces from their respective dies.

22. In a machine for operating upon cylindrical articles, the combination of a plurality of dies each adapted to operate upon the interior of an individual article, means for revolving each of said dies upon its own axis, means for supplying an individual article to be operated upon to each die, an exterior die adapted to operate upon the exteriors of said articles, and means for establishing a cooperative relation between said exterior die and each of said interior dies in succession whereby each article is subjected to the conjoint action of said exterior die and an interior die.

23. In a machine for operating upon cylindrical articles, the combination of a plurality of movable dies, a magazine for articles to be operated upon, means for feeding an article from said magazine to each of said dies in succession, means for stopping the machine upon exhaustion of articles from said magazine, a stationary die, means for causing the movable dies and the articles associated therewith to travel in succession past said stationary die, and means for removing said articles from the movable dies.

24. In a machine for operating upon cylindrical articles, the combination of a plurality of revoluble dies mounted to travel bodily around a common central axis, means for simultaneously revolving and rotating said dies, an arcuate stationary die disposed in cooperative relation to the path of travel of said rotating dies, means for feeding an individual article to each of the rotating dies, and means for removing the finished articles therefrom.

25. In a machine for operating upon cylindrical articles, the combination of a plurality of individually revoluble dies mounted to rotate bodily around a common central axis, an arcuate stationary die adapted to cooperate with said rotatable dies in succession, means for feeding an individual article to and removing the same from each of said rotatable dies, and means whereby the machine may be accommodated to articles of different lengths.

In witness of the foregoing I affix my signature.

WILLIAM CAMERON.